No. 723,804. PATENTED MAR. 31, 1903.
J. M. ALLEN.
STORAGE BATTERY.
APPLICATION FILED JULY 21, 1902.
NO MODEL.

Witnesses
Alfred A. Eicks
M. S. Irwin

Inventor
James M. Allen
by Higdon & Longan attys

UNITED STATES PATENT OFFICE.

JAMES M. ALLEN, OF ST. LOUIS, MISSOURI, ASSIGNOR TO SOLAR FURNACE AND POWER COMPANY, OF LOS ANGELES, CALIFORNIA, A CORPORATION OF ARIZONA TERRITORY.

STORAGE BATTERY.

SPECIFICATION forming part of Letters Patent No. 723,804, dated March 31, 1903.

Application filed July 21, 1902. Serial No. 116,361. (No model.)

*To all whom it may concern:*

Be it known that I, JAMES M. ALLEN, of the city of St. Louis, State of Missouri, have invented certain new and useful Improvements in Storage Batteries, of which the following is a full, clear, and exact description, reference being had to the accompanying drawings, forming a part hereof.

My invention relates to storage batteries; and it consists of the novel construction, combination, and arrangement of parts hereinafter shown, described, and claimed.

Figure 1:
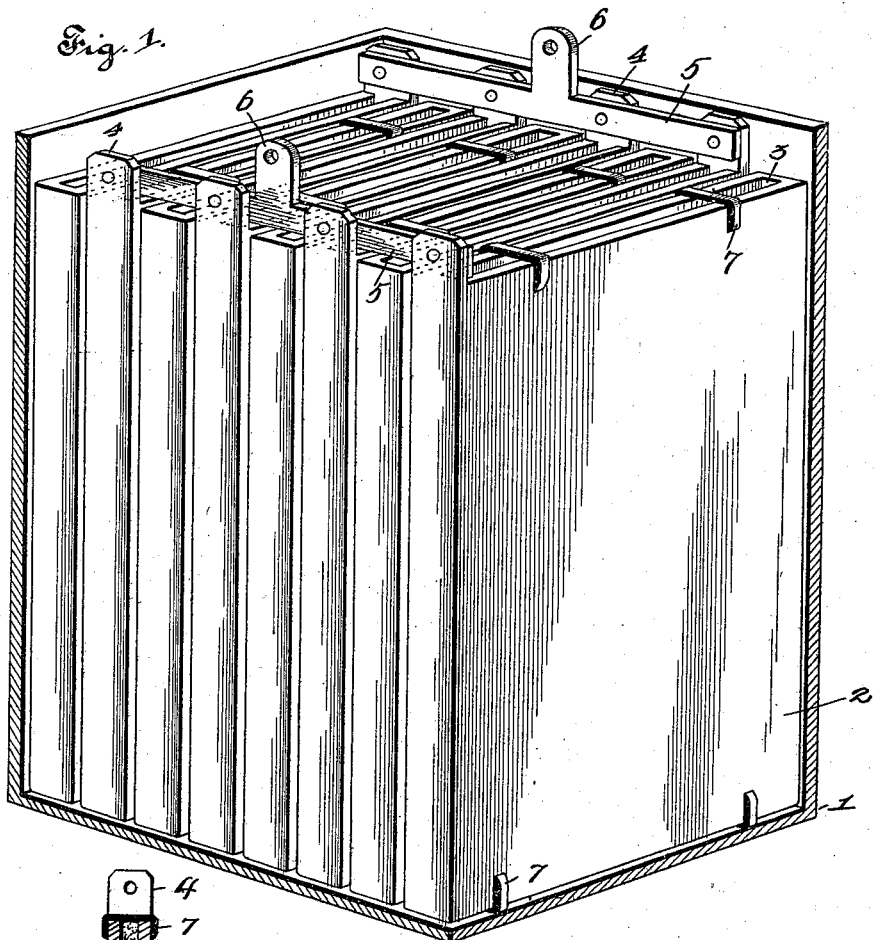
Figure 2:
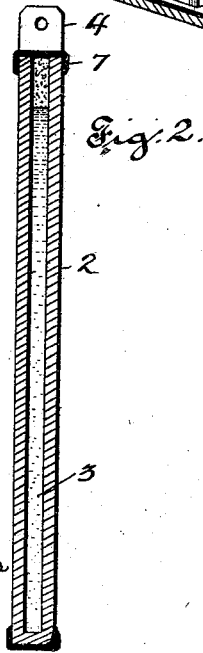
Figure 3:
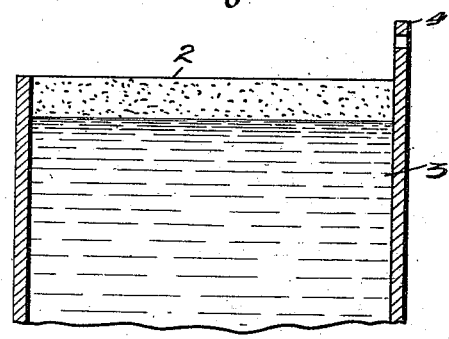

Referring to the drawings, Figure 1 is a perspective view of the storage battery with parts broken away. Fig. 2 is a transverse section of one of the plates. Fig. 3 is a longitudinal section with parts broken away.

Referring to the drawings in detail, 1 indicates the box or receptacle in which the acid and plates are placed when the parts of the battery are assembled for use. This box or receptacle may be made out of any suitable material of any suitable size and design preferred.

The essential feature of my invention is the construction of the plates embodying a peculiarity of construction which I have found from practical experience prevents the plates from buckling, which is the usual defect in storage batteries.

2 indicates the plates, which are made out of any suitable material, (preferably lead,) the same being rectangular and comparatively thin in regard to their width and provided with an opening 3, in which the energizing material is placed. It will be noticed that the plate is of a thin-shell construction and is provided at its top with connecting lugs or poles 4. In the storage battery which I have shown and described there are eight of these plates; but the number may be increased or diminished at will, depending, of course, upon the strength of battery to be constructed. Each of the plates is provided with a connecting lug or pole 4, the positive poles of the series of plates being connected and also the negative being connected.

5 indicates connecting-bars by means of which the several plates of the battery are electrically connected and mechanically held together. The bars 5 are provided with connecting-posts 6, to which suitable connecting-wires may be attached for charging the battery in the usual manner.

The plates 2 are insulated from each other by U-shaped hard-rubber insulators 7, which are placed over the top and bottom of the plates, as illustrated in the drawings.

The positive-pole plates of the battery are filled with oxid of lead and the negative pole with carbonate of lead, and after the plates have been filled and put in the receptacle or box 1, as shown, said plates are submerged in sulfuric acid, and the said sulfuric acid enters the top open ends of said plates and is absorbed by the active material contained in said plates. It will be observed in this connection that the walls of said plates are imperforate or uncut, and being of the construction heretofore described I have found by experience that the same do not buckle.

I have found by practical experience that a storage battery made in accordance with my invention is very satisfactory, especially arising from the fact that the plates do not buckle, the non-buckling being the most ordinary defect of storage batteries, which defect I have tried to overcome by a series of experiments, and I have found the plates herein shown and described to be the most satisfactory for preventing this defect.

I claim—

In a storage battery, a series of rectangular imperforate or uncut plates, each provided with one open end and with an integral connecting-lug, connecting-bars for mechanically securing and electrically connecting said plates together, connecting-posts 6 formed integral with said bars, and a series of U-shaped hard-rubber insulators adapted to fit over the edges of said plates for insulating the same from each other, substantially as specified.

In testimony whereof I affix my signature in presence of two witnesses.

JAMES M. ALLEN.

Witnesses:
 ALFRED A. EICKS,
 M. G. IRION.